United States Patent [19]
Wikdahl

[11] 3,764,006
[45] Oct. 9, 1973

[54] CYCLONIC SEPARATOR WITH LIQUID FLOW ADDED AXIALLY

[76] Inventor: Nils Anders Lennart Wikdahl, 182 64 Djursholm, Bravallavagen, Sweden

[22] Filed: Apr. 1, 1971

[21] Appl. No.: 130,115

[30] Foreign Application Priority Data
Apr. 1, 1970 Sweden.............................. 4487/70

[52] U.S. Cl. ............................................. 209/211
[51] Int. Cl. ............................................. B04c 5/12
[58] Field of Search........................... 209/144, 211; 210/512

[56] References Cited
UNITED STATES PATENTS

| | | | |
|---|---|---|---|
| 2,913,112 | 11/1959 | Stavenger et al. | 209/211 |
| 2,377,524 | 6/1945 | Samson et al. | 209/211 |
| 3,486,619 | 12/1969 | Grundelius et al. | 209/211 |
| 3,105,044 | 9/1963 | Troland | 209/211 X |
| 3,261,467 | 7/1966 | Wikdahl | 209/211 |
| 2,771,157 | 11/1956 | Gustavsson | 55/414 X |
| 3,306,444 | 2/1967 | Troland | 209/211 |
| 3,425,545 | 2/1969 | Zemanek et al. | 209/211 X |
| 3,613,887 | 10/1971 | Wikdahl | 209/211 |

Primary Examiner—Frank W. Lutter
Assistant Examiner—Ralph J. Hill
Attorney—Janes & Chapman

[57] ABSTRACT

A process is provided for separating from cellulose fiber suspensions particles lighter than or having approximately the same density as the fibers, which comprises subjecting the fiber suspension to centrifugal forces, so as to concentrate the heavier particles in liquid in a peripheral zone and concentrate the lighter particles including fibers in liquid in a central zone of the suspension, withdrawing liquid with the heavier particles from one end of the peripheral zone, withdrawing liquid with the fibers from the opposite end of the central zone, introducing additional liquid into the central zone of the suspension, and directing the flow of such axially in the direction of liquid flow in the peripheral zone.

Apparatus also is provided in the form of a cyclonic separator having an inlet in axial alignment with the apex end outlet for introducing additional liquid into the central portion of the chamber as an axial flow directed towards the outlet at the apex end of the housing.

17 Claims, 4 Drawing Figures

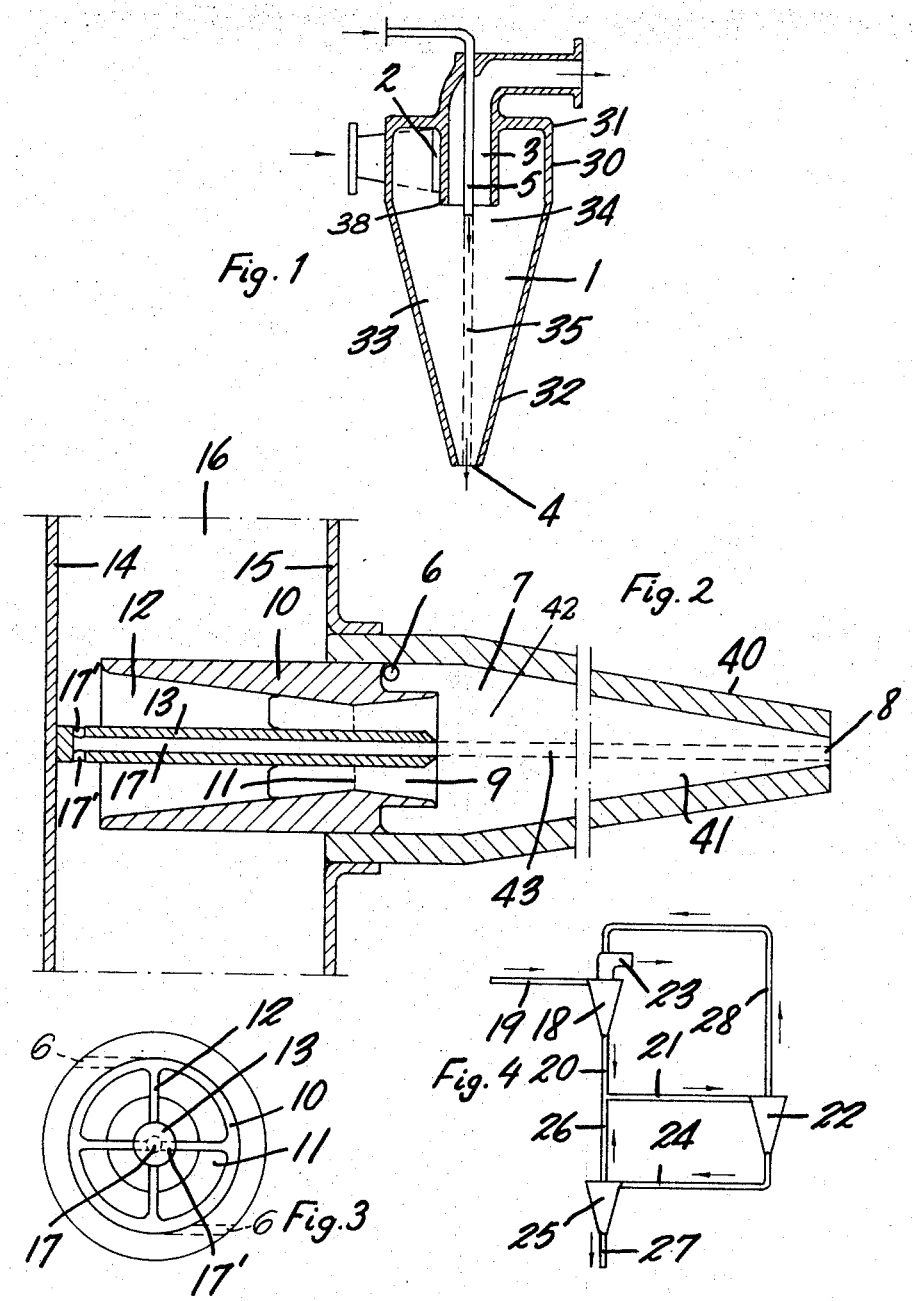

CYCLONIC SEPARATOR WITH LIQUID FLOW ADDED AXIALLY

Cellulose pulp fiber suspensions present a formidable cleaning problem, since it is necessary to separate large and small dirt and contaminant particles from cellulose fibers. Many of these particles are lighter than or have approximately the same density as the fibers, which increases the difficulty of the separation. Such particles must be removed substantially without separation of the desirable pulp fibers, which must pass through the cleaner.

Two types of apparatus are in common use, centrifugal or cyclone separators and filters. Filters are superior to the centifugal or cyclone separators in the efficiency of their separation of large particles which are absolutely incapable of passing through the filter. However, filters are not generally capable of distinguishing between dirt particles which are capable of passing through the filter, and the desired cellulose pulp fibers which also pass through the filter. Here, their separation efficiency level is very low, indeed.

On the other hand, centrifugal or cyclone separators depend upon differences in mass or density to separate the dirt and contaminant particles from the cellulose fibers. The cellulose fibers are generally lighter than most of the dirt and contaminant particles, so that the dirt and contaminant particles become concentrated in the periphery of the separator, and the cellulose fibers in a central zone of the separator. However, particles lighter than or having approximately the same density as the cellulose fibers also collect in the central zone of the separator, and are removed with the fibers. Slender impurities, such as shives and splinters, and similar particles which are either flat or long, or both, cannot be separated efficiently from cellulose pulp fibers by the centrifugal or cyclone separators heretofore available, because they are lighter than or have approximately the same density as the fibers.

In accordance with the instant invention, it has been determined that slender or flat particles such as shives and splinters lighter than or having a density similar to cellulose pulp fibers can be separated centrifugally from cellulose pulp fibers and other types of fibers in fiber suspensions if advantage be taken of their slender or flat dimension to entrain them in a counter flow of liquid at the core of the central zone in which they and the fibers are concentrated, to impel them in a direction opposite from the direction of flow of the cellulose pulp fibers, for withdrawal with the heavier particles withdrawn from the peripheral zone. Such particles, because of their greater surface area in their side or long dimension, are more readily entrained in such a cross or opposed core flow of liquid than the fibers. Consequently, such a cross or opposed flow of liquid can effectively separate those particles which can be entrained in such flow, from the cellulose pulp fibers which are not. In this way, the suspension can be substantially freed of long and/or flat non-fibrous particles which tend to collect with the fibers in a central zone of the centrifugal separator.

The process of the invention comprises centrifugally separating a fibrous suspension containing light and heavy dirt and contaminant particles into a peripheral zone which is cone-shaped at least at one end and in which heavy particles are concentrated and a central zone in which fibers and light articles are concentrated; withdrawing liquid from the peripheral zone at one end thereof; withdrawing liquid from the central zone at the opposite end thereof; causing liquid in the peripheral zone to move in one direction towards the point of withdrawal from that zone, and causing liquid in the central zone to move in the opposite direction towards the point of withdrawal from that zone; directing a core flow of liquid axially through the central zone and in a direction opposed to the flow of liquid in the central zone and in the same direction as the flow of liquid in the peripheral zone; entraining particles in the central zone having a slender or flat surface configuration in such core flow, and thereby separating such particles from the fibers there, and withdrawing the core flow with the liquid from the peripheral zone.

The cyclone separator of the invention comprises, in combination, a housing; a separator chamber in the housing that is circular in cross-section and has an apex end and a base end and is cone-shaped at least at the apex end; at least one inlet at the base end of the chamber arranged for tangential flow of fluid into the chamber; an outlet for heavier fraction at the apex end of the chamber; an outlet for lighter fraction at the base end of the chamber; and an inlet in axial alignment with the apex end outlet for introducing liquid axially at the center of the chamber in the direction of the apex end outlet.

The quantity of liquid introduced as a core flow depends upon the proportion of such particles that are to be separated, as well as the nature and character of the fibers in the suspension. In general, the volume of liquid is within the range from about 5 to 50 percent and preferably within the range from 10 percent to about 30 percent of the volume of fiber suspension being centrifugally separated.

The liquid introduced as core flow can be the liquid employed as the suspending medium in the fiber suspension, usually water. It is, however, particularly advantageous to use a light fraction discharged from the same or another centrifugal or cyclonic separator usually from a later separation stage, since this recycling increases the effectiveness of the separation. Such separator can be so arranged that a proportion of the light fraction that is discharged is recycled, as core flow, and another portion is recovered. The separation can be performed in two or more stages, in which case the light fraction taken from the second separation stage can be used as the core liquid in the first separation stage, while the heavy fraction from the first separation stage is added to the separator in the second separation stage.

Preferred embodiments of the invention are illustrated in the drawings, in which:

FIG. 1 represents a cyclone separator in longitudinal section;

FIG. 2 represents another embodiment of cyclone separator in longitudinal section;

FIG. 3 represents an end view of the cyclone separator in accordance with FIG. 2; and FIG. 4 represents a schematic arrangement of a multi-stage cyclone separator plant including a cyclone separator in accordance with the invention as one of several stages of cyclone separators.

The cyclone separator according to FIG. 1 has a housing 30 with a separation chamber 1, both of which are conical in configuration. The housing has a tangential inlet 2 (or several such inlets) at the base end 31, for introduction of fiber suspension to be cleaned. An axial outlet 4 at the apex end 32 allows for withdrawal of liquid from the peripheral zone 33, in which the heavier fraction of the chamber 1 is concentrated, under the centrifugal forces arising from the tangential introduction at the inlet 2 of the fiber suspension to be cleaned. A second axial outlet 3 at the base end 31 of the chamber is provided for withdrawal of light fraction, including fibers and shives and splinters, which becomes concentrated in the central zone 34 of the chamber 1. The outlet 3 has an inwardly extending bafflet 38, which projects towards the center of the chamber from the base end of the housing, and serves to shield the outlet 3 from the tangential flow of fiber suspension entering the chamber through the inlet 2.

Disposed axially and concentrically in the outlet 3 is a conduit 5, for introduction of a core flow of fluid axially into the central core 35 of the chamber, in an axial direction within the central zone 34, extending towards the outlet 4 at the apex end and opposite to the direction of flow of the lighter fraction moving towards the outlet 3.

In operation, an aqueous cellulose fiber suspension or other fiber suspension which is to be cleaned is introduced at the inlet 2, where it acquires a spiral or helical flow, because of the tangential arrangement of the inlet, and swirls in a generally downward spiral in the chamber 1, headed towards the outlet 4 at the apex end 32. The centrifugal forces created by this spiraling movement of the liquid tend to concentrate the heavier dirt and contaminant particles in the peripheral zone 33 of the chamber 1, while the lighter particles tend to become concentrated in the central zone 34 of the chamber 1. The liquid at the periphery of the chamber moves toward the outlet 4, while the liquid in the central portion of the chamber moves towards the outlet 3, carrying the particles entrained therein towards these outlets.

The centrifugal forces tend to distribute the particles in a series of concentric zones, with the heaviest particles the farthest from the axis of rotation. Particles having the same density tend to concentrate in the same zone. Thus, with the relatively light fibers in the central zone 34 of the chamber there are also concentrated the particles of corresponding or lighter density, such as shives, splinters and similar particles having a flat surface or a slender shape, and these particles tend to move towards the outlet 3 with the liquid being withdrawn at that outlet.

A liquid, such as a portion of the light fraction withdrawn from another or the same separator via the outlet 3, is introduced through the conduit 5, defining the core 35 of the liquid in the central zone. The liquid is introduced through the conduit 5 at a pressure and at a flow rate sufficient to create a flow of the liquid in the core 35 of the central zone 34 towards the apex end outlet 4, which is opposed to the liquid flow moving towards the outlet 3. The flat and slender particles entering this zone 35, because they offer a greater surface area to the fluid, become entrained in this axial flow, while the fibers tend not to do so, and the result is that the core flow of liquid carries a load of such entrained particles to and out the apex end outlet 4, and to this extent removing such particles from the fiber suspension leaving via the outlet 3.

The cyclone separator illustrated in FIG. 2 comprises a housing 40, conical in external configuration, provided with a central conical separator chamber 7. The separator has two tangential inlets 6, for introduction of fiber suspension to be cleaned. An axial outlet 8 at the apex end provides for withdrawal of heavy fraction from the peripheral zone 41 of the chamber, and an axial outlet 9 at the base end provides for withdrawal of light fraction from the central zone 42. The base end outlet 9 is constructed with a venturi configuration, within an end piece 10 inserted in the base end of the housing and closing off this end of the chamber, except for the outlet 9. The venturi flares outwardly in each direction from the central orifice 11, and at the exit end is provided with four baffles or walls 12, which are arranged radially, and which stop the spiral rotation of the liquid flowing through the orifice 11 and outlet 9. The walls 12 extend outwardly from a central hub 13, which is in the form of a conduit having a central open passage 17, opening at one end into the chamber 7, and at the other end by way of a plurality of orifices 17' into the space 16 at the end of outlet 9, so that liquid may flow from the exit end 12 of the venturi through the orifices 17' and thence through the passage 17 back into the separation chamber 7. Such movement is a feature of this embodiment of conical separator in accordance with the invention, which accordingly automatically provides for recycling of a portion of the light fraction leaving the chamber 7 through the outlet 9 as the axial flow of liquid enhancing separation of slender and flat dirt and contaminant particles. Such flow defines an axial core flow 43 at the center of chamber 7, in the direction towards the apex end outlet 8.

The end piece 10 opens at its exit end into a housing 14, which defines a collection chamber 16 for light fraction leaving the chamber 7. The housing 14 is attached to the conical housing portion 40 at the base end. Suitable line connections (not shown in FIG. 2) provide for withdrawal of light fraction from the collection chamber 16.

In operation, aqueous cellulose fiber suspension or other fiber suspension to be cleaned is introduced into the conical separator chamber 7 by way of the tangential inlets 6, acquiring a spiral flow moving towards the apex end outlet 8. In the course of this spiraling movement, the heavier particles are concentrated in the liquid in the peripheral zone 41 of the chamber 7, and the lighter particles become concentrated in the liquid in the central zone 42 of the chamber 7. The liquid in the central zone tends to move toward the outlet 9. The liquid in the peripheral zone 41 containing the heavier particles tends to move towards the outlet 8, where it is withdrawn.

The lighter fraction leaving through the outlet 9 passes through the venturi orifice 11 of the end piece 10, and in the course of this movement, a proportion of the kinetic energy of the moving fluid is converted into static head at the orifice, and this conversion is enhanced by the baffles or walls 12. As a result of this effect of the orifice 11, in the light-fraction-receiving chamber 16, the fluid pressure is always higher than the fluid pressure in the conical separator chamber 7. The existence of this higher pressure causes a proportion of the lighter fraction emerging at the exit end of the orifice to enter the orifices 17' and move towards the chamber 7 through the central passage 17. The rate of flow and the fluid pressure of this axial flow of fluid is determined by the difference in pressure between the core portion 43 of chamber 7 and the light fraction receiving chamber 16. This axial fluid flow towards the apex end outlet 8 tends to entrain the slender particles and the flat particles entering the core 43 of the central zone 42 of the chamber 7, and drive these towards the outlet 8, reducing the proportion of dirt and contaminant particles in the light fraction leaving the chamber through the outlet 9.

The separator system for a paper pulp or cellulose fiber plant shown in FIG. 4 includes three cyclone separators 18, 22, 25, and the separation is carried out in three stages. The separator 18 is a separator in accordance with the invention. The other two separators 22 and 25 are conventional, and are not provided with means for introducing an axial flow of fluid in accordance with the invention.

The cellulose fiber or other fiber suspension to be cleaned is supplied to the first stage cyclone separator 18 through a feed pipe 19. The heavy fraction is withdrawn at the apex end via line 20, and the lighter fraction is withdrawn at the base end via line 23. The heavy fraction passes through lines 20, 21 to the second stage cyclone separator 22. From the separator 22, the heavy fraction removed at the apex end is fed through line 24 to the third stage cyclone separator 25. From this separator, a purified light fraction is withdrawn at the base end by way of line 26, and this is recycled via line 21 with the heavy fraction from the first separator 18 to the second separator 22. The heavy fraction concentrated after the third stage is removed at the apex end of the separator 25 by way of line 27, and discharged from the system.

The light fraction separated in the second stage separator 22 is returned through line 28 to the axial inlet pipe 5, as seen in FIG. 1, to be used as the axial flow of fluid to enhance the separation of slender and flat impurities. Alternatively, the light fraction from the separator 25 can be introduced by way of line 28 to the first separator, either with the light fraction from the separator 22 or by itself, in which event the light fraction from the separator 22 is returned to the inlet 19 of the separator 18.

It will be apparent that many modifications can be made in the cyclone separators of the invention. For example, the cyclone separators may have one or several tangential inlets. Also, for example, the means for introduction of additional liquid need not be at the base end of the cyclone separator. It can be arranged to introduce fluid at a portion of the central zone spaced from the base end, and nearer to the apex end. The closer the inlet for such fluid is to the apex end, however, the less the efficiency, because such particles entering the central zone above the point of introduction of the fluid then tend to escape with the light fraction.

Having regard to the foregoing disclosures, the following is claimed as the inventive and patentable embodiments thereof:

1. A process for separating from fiber suspensions dirt and contaminant material having a density approximating or lighter than the fibers, which comprises centrifugally separating in a cyclonic zone which is at least in part cone-shaped a fibrous suspensions containing light and heavy dirt and contaminant particles into a heavy fraction comprising heavy particles in a peripheral portion of the zone, and a light fraction comprising fibers and light particles in a central portion of the zone; withdrawing heavy fraction from the peripheral portion of the zone at apex end thereof; withdrawing light fraction from the central portion of the zone at the opposite end thereof; causing heavy fraction in the peripheral portion to move in one direction, towards the point of its withdrawal from the zone, and causing light fraction in the central portion to move in the opposite direction, towards the point of its withdrawal from the zone; directing a core flow of liquid axially through the central portion of the zone and in a direction opposed to the flow of light fraction in the central portion and in the same direction as the flow of heavy fraction in the peripheral portion of the zone; entraining in such core flow light dirt and contaminant particles having a slender or flat surface configuration from the central portion of the zone, and thereby separating such particles from the fibers there, and withdrawing the core flow with the heavy fraction from the peripheral portion of the zone.

2. A process according to claim 1 in which the fiber suspension is an aqueous cellulose fiber suspension, and the dirt and contaminant material include shives and splinters.

3. A process according to claim 1 in which the proportion of liquid introduced as core flow is in a volume within the range from about 5 percent to about 50 percent by volume of the fiber suspension being centrifugally separated.

4. A process according to claim 1 in which the core liquid is water.

5. A process according to claim 1 in which the core liquid is fiber-containing liquid withdrawn from the central zone.

6. A process according to claim 5 in which the fiber suspension is processed through a multiplicity of separation stages, and the core liquid is fiber-containing liquid withdrawn from the central zone of another separation stage.

7. A process according to claim 5 in which the core liquid is fiber-containing liquid withdrawn from the central zone of the same separation.

8. A cyclonic separator comprising a housing with a separator chamber therein that is circular in cross-section, has an apex end and a base end, and is cone-shaped at least in part; at least one fluid inlet through the housing at the base end, arranged for tangential flow of fluid into the chamber, to establish a vortical fluid flow in the chamber; an outlet through the housing in axial alignment to the chamber at the base end of the chamber; and an outlet through the housing in axial alignment to the chamber at the apex end of the chamber; the apex end outlet receiving peripheral zone vortical fluid flow from the chamber, and the base end outlet receiving central zone vortical fluid flow from the chamber; a core flow inlet in axial alignment with the apex end outlet for introducing liquid axially within the core of the vortical fluid flow in the chamber in the direction of the apex end outlet; a light-fraction-receiving chamber in fluid flow connection with the base end outlet; and a fluid flow connection between the light-fraction-receiving chamber and the core flow inlet, for recirculating liquid in the light-fraction-receiving chamber to the core of vortical fluid flow in the separation chamber.

9. A cyclonic separator according to claim 8, comprising a cascade series of cyclonic separators interconnected in a manner such that the base outlet from each successive separator is combined in series with a tangential or core inlet of an earlier separator in the series.

10. A cyclonic separator according to claim 8 wherein a tubular baffle extends from the base outlet into the separator chamber to a point beyond the inlet, to deflect inlet flow away from the base outlet.

11. A cyclonic separator according to claim 8, in which the sides of the separator chamber define a straight- and smooth-sided conical space.

12. A cyclonic separator according to claim 8, in which the tangential inlets are at least two in number, and uniformly spaced.

13. A vortex separator according to claim 8, in which the chamber is conical at least in a major portion.

14. A cyclonic separator according to claim 8, in which the core flow inlet is in the form of a conduit coaxially disposed in the base end outlet.

15. A cyclonic separator according to claim 8, in which the base end outlet for light fraction includes an orifice producing pressure in the light-fraction-receiving chamber which is higher than that in the separator chamber.

16. A cyclonic separator according to claim 15, in which the orifice is in the form of a venturi.

17. A cyclonic separator according to claim 15, in which the base end outlet, beyond the orifice, is provided with a baffle to arrest spiraling movement of fluid passing through the outlet, and increase pressure in the light-fraction-receiving chamber.

* * * * *